(12) United States Patent
Hoyer et al.

(10) Patent No.: US 10,496,940 B2
(45) Date of Patent: Dec. 3, 2019

(54) PRESENTING RESOURCE UTILIZATION IN A USER INTERFACE

(71) Applicant: SAP SE, Walldorf (DE)

(72) Inventors: Timo Hoyer, South San Francisco, CA (US); Nicole Geller, Saarbruken (DE); Christian Scheirmann, Bad Schoenborn (DE)

(73) Assignee: SAP SE, Walldorf (DE)

( * ) Notice: Subject to any disclaimer, the term of this patent is extended or adjusted under 35 U.S.C. 154(b) by 752 days.

(21) Appl. No.: 14/955,333

(22) Filed: Dec. 1, 2015

(65) Prior Publication Data
US 2017/0153799 A1    Jun. 1, 2017

(51) Int. Cl.
*G06F 3/0484* (2013.01)
*G06Q 10/06* (2012.01)

(52) U.S. Cl.
CPC .............................. *G06Q 10/0631* (2013.01)

(58) Field of Classification Search
CPC ...... G06F 3/048; G06F 3/0481; G06F 3/0482; G06F 3/0484; G06Q 10/00; G06Q 10/06
See application file for complete search history.

(56) References Cited

U.S. PATENT DOCUMENTS

| | | | |
|---|---|---|---|
| 8,400,467 B1* | 3/2013 | Ponce de Leon .. | G06Q 10/0631 345/619 |
| 9,003,551 B2 | 4/2015 | Hoyer | |
| 9,818,076 B2* | 11/2017 | Aparimit .......... | G06Q 10/06312 |
| 2009/0094545 A1* | 4/2009 | Kneisel ................ | G06Q 10/06 715/771 |
| 2009/0234699 A1* | 9/2009 | Steinglass ............. | G06Q 10/06 705/7.23 |
| 2010/0064254 A1* | 3/2010 | Atsmon ............ | G06F 17/30247 715/810 |
| 2010/0195883 A1* | 8/2010 | Patriarche ........... | G06K 9/3233 382/131 |
| 2012/0059282 A1* | 3/2012 | Agichtein ............. | A61B 3/113 600/587 |
| 2012/0260179 A1* | 10/2012 | Reshadi ................ | G06F 9/5061 715/735 |
| 2013/0041708 A1* | 2/2013 | Jackson, Jr. ....... | G06Q 10/0631 705/7.22 |
| 2013/0298060 A1 | 11/2013 | Hoyer et al. | |
| 2013/0321285 A1 | 12/2013 | Hoyer et al. | |

(Continued)

*Primary Examiner* — Xiomara L Bautista
(74) *Attorney, Agent, or Firm* — Fish & Richardson P.C.

(57) ABSTRACT

Methods, systems, and computer-readable storage mediums for presenting resources utilization in a user interface (UI) are provided. Implementations include actions of presenting a first view of the UI that includes a first plurality of resources displayed in a first area and an assignment scheduling view displayed in a second area that is defined along a timeline and comprises assignment visual elements representing assignments assigned to respective resources over respective time periods along the timeline, receiving an input for switching the UI from the first view to a second view, and presenting the second view that includes a second plurality of resources in the first area and a map in the second area including, for each of the second plurality of resources, a respective utilization visual element along the timeline representing respective utilization of the resource at each time point of the timeline in a visual gradient.

20 Claims, 7 Drawing Sheets

(56) References Cited

U.S. PATENT DOCUMENTS

| | | | |
|---|---|---|---|
| 2013/0339082 A1 | 12/2013 | Kazmaier et al. | |
| 2014/0028680 A1* | 1/2014 | De Pauw | G06T 11/206 345/440 |
| 2014/0089860 A1 | 3/2014 | Hoyer et al. | |
| 2014/0108974 A1 | 4/2014 | Hoyer | |
| 2014/0164238 A1 | 6/2014 | Hoyer | |
| 2015/0029193 A1* | 1/2015 | Krajec | G06T 11/206 345/440 |
| 2016/0013990 A1* | 1/2016 | Kulkarni | H04L 41/22 709/224 |
| 2017/0010756 A1* | 1/2017 | Liensberger | G06F 3/0481 |
| 2017/0093645 A1* | 3/2017 | Zhong | G06F 3/0482 |

* cited by examiner

PRESENTING RESOURCE UTILIZATION IN A USER INTERFACE

BACKGROUND

Enterprise software systems (enterprise systems) can be used to perform enterprise-level operations. Example enterprise systems can include enterprise resource planning (ERP) systems, client-relationship management (CRM) systems, product lifecycle management (PLM) systems, supply chain management (SCM) systems, and supplier relationship management (SRM) systems.

Enterprise software systems can include resource scheduling functionality. For example, the enterprise systems can include resource scheduling applications, through which users, e.g., resource managers, can create tasks or assignments to individual resources using resource management charts (e.g., Gantt charts). While presentation of the resource management charts in user interfaces (UIs) provide detailed information for the tasks or assignments, display size can limit the number of individual resources displayed. This limits the overall view on the underlying information, which limits the user's ability to determine the overall utilization/availability of the resources. In some cases, a user clutters a UI to determine the utilization of the resources by shrinking detailed views and fitting more shrunken views in the UI, which may be inconvenient, and does not display the relevant information in an efficient manner.

SUMMARY

Implementations of the present disclosure include computer-implemented methods for presenting resources utilization in user interfaces. In some implementations, methods include actions of presenting a first view of the UI on a display screen, the first view including a first plurality of resources displayed in a first area and an assignment scheduling view displayed in a second area, the assignment scheduling view being defined along a timeline and including a first assignment visual element representing a first assignment assigned to a first resource over a first time period along the timeline, the first assignment visual element including information associated with the first assignment; receiving an input for switching the UI from the first view to a second view; and presenting the second view of the UI on the display screen, the second view including a second plurality of resources displayed in the first area and a map displayed in the second area, the map being defined along the timeline and including, for each resource of the second plurality of resources, a respective utilization visual element along the timeline, the utilization visual element representing respective utilization of the resource at each time point of the timeline in a visual gradient. The second plurality of resources includes the first plurality of resources, and a number of the second plurality of resources is greater than a number of the first plurality of resources, and the map includes a first utilization visual element for the first resource that excludes the information associated with the first assignment.

These and other implementations can each optionally include one or more of the following features: the first time period includes a plurality of first time points along the timeline, and the first assignment visual element represents respective utilization of the first resource by the first assignment at each of the plurality of first time points, and, at each of the plurality of the first time points, the first utilization visual element is determined in the visual gradient at least partially based on the respective utilization of the first resource by the first assignment; the assignment scheduling view includes a second assignment visual element representing a second assignment assigned to the first resource over a second time period along the timeline, the second time period including a particular time point of the first time points in the first time period, and, at the particular time point, the first utilization visual element is determined in the visual gradient based on a sum of a first utilization of the first resource by the first assignment and a second utilization of the first resource by the second assignment; the map is a heat map, and the visual gradient is a color scale or a gray scale, and a white color in the visual gradient represents no utilization of a resource, and a heavier color represents larger utilization of a resource than a lighter color; actions further include: receiving a second input for switching the UI from the second view to the first view, and presenting the first view of the UI on the display screen; actions further include: receiving a second input for zooming in the map in the second view; blurring, using a blurring filter, the utilization visual elements of the map in the second area; and actions further includes: determining that a portion of a particular utilization visual element of the map in the second view is selected, the particular utilization visual element corresponding to a particular resource, the selected portion corresponding to a particular assignment assigned to the particular resource, and hovering, in the second view, a display over the map and adjacent to the selected portion, the display including information associated with the particular assignment.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to presenting resources utilization in a user interface (UI). More particularly, implementations of the present disclosure are directed to presenting resources utilization in the UI based on a heat map. The heat map shows a compressed view of the availability or utilization of the resources on a higher level than a detailed view (e.g., a Gantt-chart-like view). In some examples, the heat map includes, for each resource, a respective utilization visual element (e.g., a bar having color variation) along a timeline. The utilization visual element represents respective utilization of the resource at each time point of the timeline in a visual gradient (e.g., a color scale). The utilization visual elements can exclude information associated with assignments assigned to the resources, such that more individual resources can be represented in the user interface than in other types of UIs.

In some implementations, the UI includes a slider for zooming in or out of the utilization visual elements of the heat map. The zooming function can be associated with a blurring filter (e.g., a Gaussian filter). When the slider is selected to zoom the heat map in, the heat map is blurred to provide a more abstract view to show the availability of the resources. When the slider is selected to zoom the heat map out, the heat map is sharped to get a less abstract view. A user (e.g., a resource manager) can adjust the slider by sliding a slider control (e.g., from left to right).

In some implementations, the UI includes a button for switching between a compressed view (i.e., the heat map view) and a detailed view. For example, a user can click the button to switch the UI from the compressed view to the detailed view that includes detailed information associated with the assignments (e.g., assignment titles or types). The user can also edit or drill down assignments or add new assignments in the detailed view.

In some implementations, the UI enables a user to view detailed information of an assignment without toggling from the compressed view to the detailed view. For example, the user can select a portion of a utilization visual element for a resource in the map. The selection portion can represent an assignment assigned to the resource. In response to the user selecting the portion, a display can be hovered over the heat map and adjacent to the selected portion. The display can include detailed information associated with the assignment for the selected portion.

Figure 1:
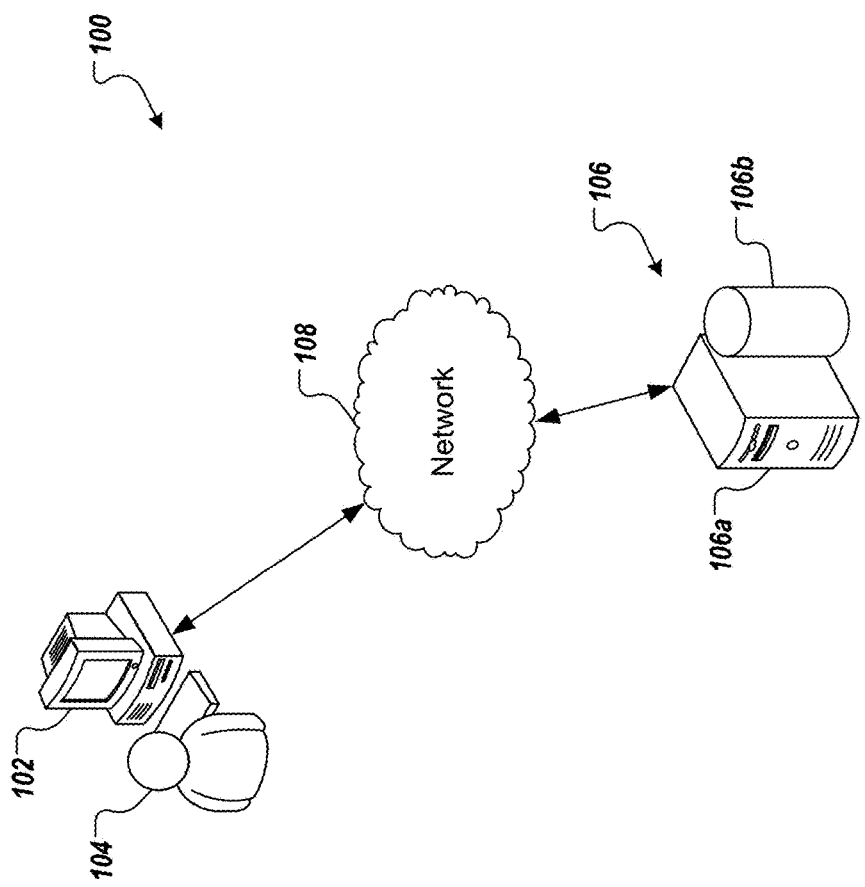
FIG. 1 depicts an example architecture that can be used to realize implementations of the present disclosure.

FIG. 1 depicts an example architecture 100 that can be used to realize implementations of the present disclosure. The example architecture 100 includes a client device 102 communicably connected to a back-end system 106 by a network 108. The client device 102 is operated by a user 104. In some examples, the client device 102 can be a computing device such as a laptop computer, a desktop computer, a smartphone, a personal digital assistant, a portable media player, a tablet computer, or any other appropriate computing device that can be used to communicate with the back-end system 106. In some examples, the back-end system 106 can include one or more computing devices 106a, such as a server, and one or more database systems 106b. In some examples, the back-end system 106 can represent more than one computing device working together to perform the actions of a server (e.g., cloud computing).

In some implementations, the database system 106b is provided as an in-memory database system. In some examples, an in-memory database is a database management system that uses main memory for data storage. In some examples, main memory includes random access memory (RAM) that communicates with one or more processors (e.g., central processing units (CPUs)) over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage database systems.

In some examples, the network 108 can be a public communication network (e.g., the Internet, cellular data network, dialup modems over a telephone network), a wide area network (WAN), a local area network (LAN), a private communications network (e.g., private LAN, leased lines), or any appropriate combination thereof.

In accordance with implementations of the present disclosure, the back-end system 106 can host one or more enterprise systems. In some examples, an enterprise system can be provided as one or more computer-executable programs executed by one or more computing devices. Example enterprise systems can include an enterprise resource planning (ERP) system, a client-relationship management (CRM) system, a product lifecycle management (PLM) system, a supply chain management (SCM) system, and supplier relationship management (SRM) system.

The back-end system 106 can include a resource scheduling system (e.g., a Multi-Resource Scheduling (MRS) system). The resource scheduling system can be standalone (e.g., pulls data from other enterprise systems such as ERP, CRM, PLM, SCM, and/or SRM), or it can be included in one or more of other enterprise systems ERP, CRM, PLM, SCM, and/or SRM.

As introduced above, the resource scheduling system can be configured for resource scheduling and management. The user 104 can be a resource manager, and can use the resource scheduling system to create tasks or assignments to individual resources (e.g., using resource management charts such as Gantt charts). The resource scheduling system can provide a UI (e.g., a graphical user interface (GUI)). The user 104 can use the client device 102 to access the resource scheduling system, and the UI of the resource scheduling system can be presented on a display screen of the client device 102. The utilization of the resources can be presented in the UI.

In some implementations, the resource scheduling system presents the resources utilization in a detailed view (e.g., in a Gantt-chart-like view), or in a compressed view, as discussed in further detail below. In the detailed view, the user can edit or drill down assignments and/or add new assignments to one or more resources. The detailed view includes detailed information associated with assignments (e.g., assignment titles and/or types), and/or information about resources (e.g., resources roles and/or any other properties).

The compressed view can hide the detailed information about assignments and/or resources. The compressed view can present more individual resources than in the detailed view and present the utilization or availability of the individual resources. In some examples, the user 104 may use the compressed view to quickly identify when a specific resource is available or when one or more resources are available, such that the user 104 can plan new assignments for the resources without having negative impact on the resources' work load. The user 104 can switch the UI between the detailed view and the compressed view.

Implementations of the present disclosure will be described in further detail herein with reference to an example context. The example context includes resources being human resources (e.g., people). It is appreciated that implementations of the present disclosure are not limited to the example context and may be applicable in any appropriate context. For example, the resources can be in the form of machines, materials, tools, computing devices, spaces, vehicles, and/or virtual resources.

FIGS. 2A-2D depict example screenshots in accordance with implementations of the present disclosure. The screenshots depict views of a UI on a display screen (e.g., of the client device 102 of FIG. 1). The UI can be provided by a resource scheduling system (e.g., the resource scheduling system in the back-end system 106 of FIG. 1).

Figure 2A:
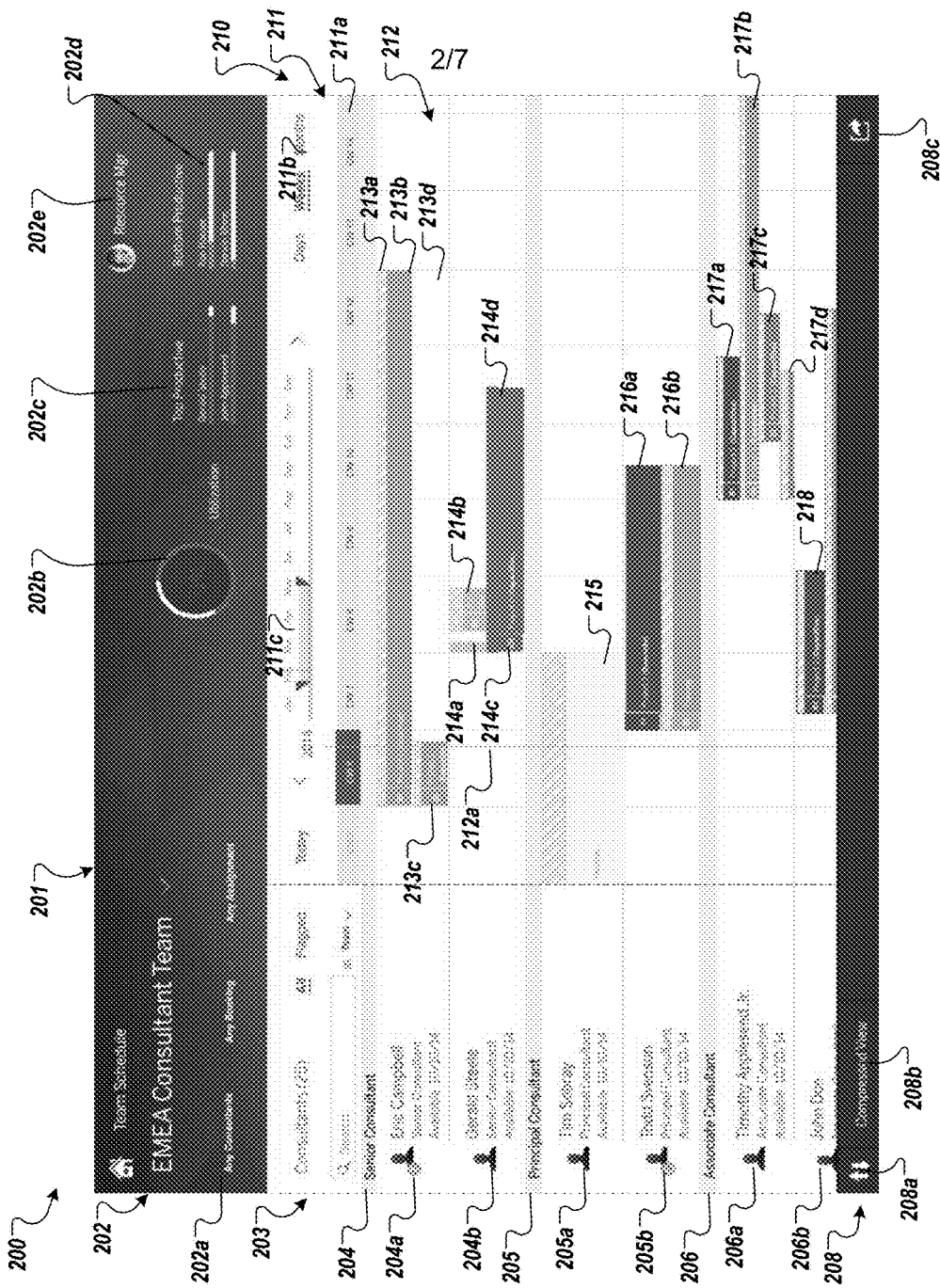
FIGS. 2A-2D depict example screenshots in accordance with implementations of the present disclosure.

FIG. 2A depicts an example detailed view 200 of the UI. The detailed view 200 can be a Gantt-chart-like view, or a calendar view. A user (e.g., a resource manager) can view utilization of each resource by each assignment with detailed information (e.g., resource type, assignment title and/or type, or assignment duration). The user can also edit, drill down, or add assignments in the detailed view 200.

In the depicted example, the detailed view 200 is displayed in an area 201, which can be a total area of the display screen. The example detailed view 200 includes a first area 202, a second area 203, a third area 208, and a fourth area 210. The four areas 202, 203, 208, 210 are distributed within the area 201, and do not overlap with each other. The four areas 202, 203, 208, 210 occupy the total area of the area 201.

The first area 202 can be on the top of the detailed view 200 and configured to show overall information associated with a collection of resources (e.g., a team). In the depicted example, a team includes a number of human resources (e.g., consultants). The first area 202 can include a label for the name of the team (e.g., "EMEA Consultant Team"). A circular indicator 202b can be used to show a total percentage of utilization of the resources in the team (e.g., "71%"). The first area 202 can also show one or more consultants with top productive 202c, that is, a higher utilization, and one or more consultants with bottom productive 202d, that is, a lower utilization. The names of the consultants can be presented together with color bars showing their corresponding utilization. A resource manager 202e can be presented by an icon. A "V" symbol adjacent to the icon can be used to show details about the resource manager 202e. The first area 202 can also include a filter 202a which can be configured to filter the consultants by consultant type, booking type, and/or assignment.

In the depicted example, the second area 203 shows the plurality of consultants. The second area 203 can show a total number of consultants (e.g., "25"). The second area 203 can also include a search box for a user to search a particular consultant. The second area 203 can be on the left side of the view 200.

The number of consultants can be categorized and listed by the consultant type (e.g., senior consultant 204, principal consultant 205, and associate consultant 206). For example, the senior consultant category 204 can include consultant 204a and consultant 204b. The principal consultant category 205 can include consultant 205a and consultant 205b. The associate consultant category 206 can include consultant 206a and consultant 206b. Each consultant's name is presented, together with and respective consultant type. In some implementations, availability of a particular day of each consultant is also shown in the second area 203. In the depicted example, due to limited space in the second area 203, there are only 6 consultants out of 25 shown in the second area 203. Information on consultant 206b is just partially shown.

Figure 2B:
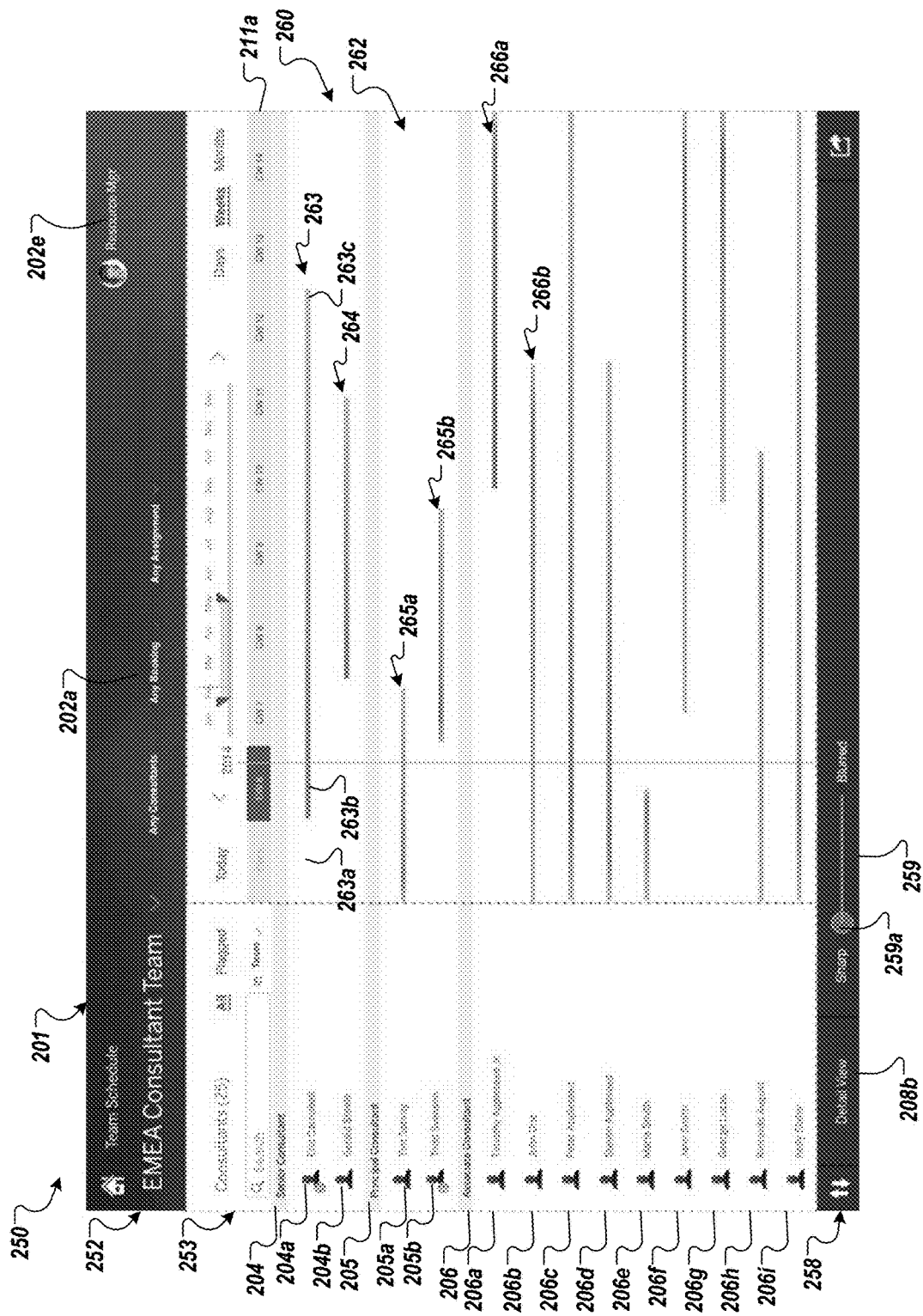
Figure 2C:
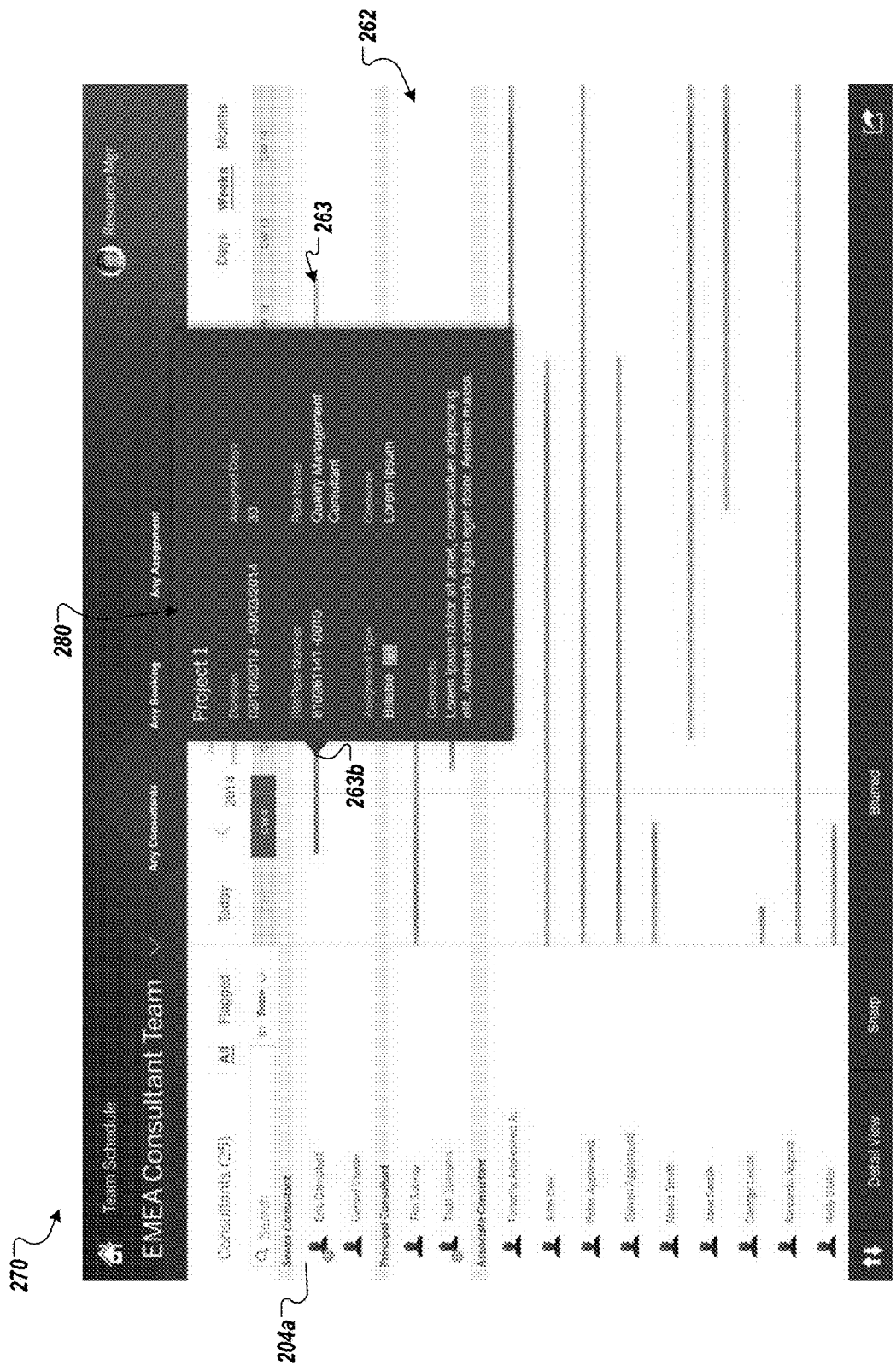
Figure 2D:

The third area 208 is on the bottom of the view 200. The third area 208 can include a selection button 208a. A user can use the selection button to show other hidden consultants. In some implementations, the third area 208 includes a button 208b configured to switch the UI between a compressed view and a detailed view. When the use interface shows the detailed view, as illustrated in FIG. 2A, a label on the button 208b shows "Compressed View." When the user interface shows the compressed view, as illustrated in FIGS. 2B-2D, the label on the button 208b shows "Detailed View." The third area 208 can also include a button 208c configured to forward or save the view 200.

The fourth area 210 shows an assignment scheduling view 212 (e.g., a Gantt chart view). The assignment scheduling view 212 is defined by a timeline 211a. The timeline 211a can be determined by different time scales 211b (e.g., in Days, Weeks, or Months). A user can choose a time period 211c including a starting date to an ending date to be used as the timeline 211a. For example, in FIG. 2A, the time scale 211b is selected to be "Weeks," and the time period 211c is selected from week 5 to week 14, thus the timeline 211a is shown from week 5 to week 14 (e.g., labelled as "CW5" to "CW14"). The timeline 211a can be presented along a row (e.g., in a horizontal direction).

The assignment scheduling view 212 is configured to show assignments assigned to resources. In some implementations, the assignment scheduling view 212 includes an assignment visual element (e.g., a rectangular box) to represent an assignment assigned to a resource over a time period along the timeline. The assignment visual element can be filled with a color (e.g., color-scale, grey-scale). Different colors can represent different projects. Each project can include multiple assignments assigned to multiple resources. For example, as illustrated in FIG. 2A, "project 1" is presented by green, "project 2" is presented by red, and "project 3" is presented by purple. Each assignment visual element can include information associated with the corresponding assignment (e.g., assignment titles or types). For example, box 213b is labelled with "Project 1 (Stretched)", and box 214d is labelled with "Project 2 (Capacitive)." In some cases, an assignment visual element is too small and no label is added on the assignment visual element (e.g., box 214a, 214c).

Each time period can include a plurality of time points. The time points can be sequential to each other. Each time point can be a time scale smaller than or same as the selected time scale 211b. For example, in FIG. 2A, the selected time scale 211b is "WEEKS," and the time point can be a day. Within each time point (e.g., a day), a resource's utilization by an assignment can be determined on smaller time scale (e.g., a half day, a hour, a half hour, or a minute). The resource's utilization by the assignment can be represented by the assignment visual element along a direction perpendicular to the timeline 211a (e.g., along a column). For example, a day includes working hours from 8 AM to 5 PM. An assignment can be assigned to some of the working hours and represented by the assignment visual element at a corresponding period along the direction, or a column timeline.

As depicted in the example of FIG. 2A, for consultant 204a, at a day of Week 5, the working hours in the morning (e.g., from 9 AM to 12 PM), and the working hours in the afternoon (e.g., from 2 PM to 5 PM), are occupied by the assignment "project 1" and shown by green rectangle boxes 213b and 213c, respectively. Consultant 204a is not available at the remaining hours in the day (e.g., from 8 AM to 9 AM and from 1 PM to 2 PM), which is represented by rectangle box 213a filled with a gray pattern. Hours that are not assigned to any assignment and are available can be left blank such as 213d. The utilization of the consultant 204a in a day can be represented by the utilization of the consultant 204a at each working hour of the day, as shown by boxes 213b and 213c. In some implementations, the utilization of the consultant 204a in a day can be represented by a total percentage of utilization based on the utilization at each working hour.

In another example, a consultant can be occupied by multiple assignments. For example, in one day of week 11, consultant 206a is occupied by project 3 (represented by 217a), project 4 (represented by 217b), project 1 (represented by 217c), and project 5 (represented by 217d). The representations 217a to 217d are positioned along two dimensions, one along the row timeline 211a and the other along a column.

In some examples, an assignment can be assigned to different resources over different time periods. For example, project 1 is assigned to consultant 204a in a first time period with morning hours (e.g., 9 AM to 12 PM) each day from week 6 to week 12 and a second time period with afternoon hours (e.g., 2 PM to 5 PM) each day at week 6, and to consultant 206a for a third time period with afternoon hours (e.g., 3 PM to 4 PM) each day from Friday of week 10 to Tuesday of week 12. In another example, project 3 is assigned to consultant 205b (represented by box 216a), consultant 206b (represented by box 218a), and consultant 206a (represented by box 217a).

An assignment can be an active assignment (e.g., a project), or a passive assignment (e.g., vacation, sick leave, training). The passive assignment can be considered as utilization of a resource and not available. Different colors can be used to represent different types of assignments. In some cases, a gray color can be used to represent a vacation passive assignment (e.g., box 215 shows a vacation from week 5 to week 7 for consultant 205a). A blue color can be used to represent a training passive assignment (e.g., box 216b shows a training from week 7 to week 10 for consultant 205b).

In some examples, an assignment can be hard-booked, which means that the assignment is confirmed or granted by a high-level officer or administrator and can be put in the assignment scheduling chart in the detailed view 200. In some examples, an assignment can be soft-booked, which means that the assignment is pending and not confirmed. The assignment can be also put in the assignment scheduling chart. In some examples, the soft-booked assignment can be presented differently from the hard-book assignment by using different colors or shapes.

In some implementations, the fourth area 210 includes a vertical line 212a across all the resources presented on the view 200. The vertical line 212a intersects with the timeline 211a at a particular time point (e.g., a particular day). Correspondingly, the second area 203 can show the availability for each of the resources at the particular time point. By default, the vertical line 212a is at the current date (e.g., Today). The user can also move the vertical line 212a to get information at any desired time point.

In some examples, the user may want to have a bird's eye view of resource utilization (e.g., in order to quickly identify when a specific resource is available). In this view, some detailed information can be hidden and more individual resources can be presented. As noted above, the user can switch the UI from the detailed view 200 to a compressed view. For example, the user can click the button 208b. The resource scheduling system can receive the user input from the UI and present the compressed view in the UI (e.g., on the same display screen as the detailed view 200).

FIG. 2B shows an example compressed view 250. The compressed view 250 can be generated based on the detailed view 200 of FIG. 2A (e.g., using a data visualization methodology from infographics). The compressed view 250 can be in the same area 201 as the detailed view 200.

In some implementations, the compressed view 250 includes a first area 252. The first area 252 can be similar to the first area 202 of FIG. 2A, but with less features and smaller area size than the first area 202. For example, the first area 252 can still keep the filter 202a and the user icon 202e, but hide information of 202b, 202c, and 202d. Thus, the compressed view 250 can have more space showing resources in a second area 253 and utilization of the resources in a third area 260.

The second area 253 can be similar to the second area 203 of FIG. 2A, but with less features and larger area size than the second area 203. For example, the second area 253 can keep a name of each consultant but hide information associated with the consultant (e.g., resource type and availability at a particular time point) that is shown under the name of the consultant in the second area 203 of FIG. 2A. In this manner, the second area 253 can show more consultants than the second area 203. Besides the previously shown consultants 204a, 204b, 205a, 205b, 206a and 206b, the second area 253 shows more new consultants 206c to 206i. The number of consultants shown in the second area 253 is 13, larger than the number of consultants shown in the second area 203, that is 6.

In the third area 260, the utilization of the resources can be represented by a map 262. The map 262 can be defined along the timeline 211a. In some implementations, the map 262 is a heat map and the visual gradient is a color scale or a gray scale or any other types of visual gradient. A heavier gradient represents larger utilization of a resource than a lighter gradient. As an example, FIG. 2B shows the visual gradient as a color scale with red as the heaviest color to indicate 100% utilization of the resource (e.g., 0% availability), and white to indicate 0% utilization of the resource (e.g., 100% availability). Lighter red, orange and/or yellow can be used to indicate a certain percentage of utilization, respectively.

The map 262 can be generated based on the assignment scheduling view 212. For each resource in the second area 253, the map includes a respective utilization visual element (e.g., a color bar) along the timeline 211a. The utilization visual element represents respective utilization of the resource at each time point (e.g., each day) of the timeline 211a in a visual gradient. As noted above, the assignment scheduling view 212 can show each resource utilized by one or more assignments at each time point. Thus, the utilization of the resource at each time point along the timeline can be a sum of the utilization by the one or more assignments at the time point. The utilization of the resource at each time point can be presented by a percentage (e.g., 80%), which can correspond to a gradient in the visual gradient (e.g., a color in the color scale).

As an example, a color bar 263 shows utilization of consultant 204a in a selected time period (from week 5 to week 14). Since consultant 204a has no assignment at week 5, 13, and 14, a blank 263a is shown, indicating that consultant 204a is available during these weeks. On one day in week 5, consultant 204a is occupied by the first assignment 213b and the second assignment 213c and has a higher utilization (e.g., 70%). On one day in week 12, consultant 204a is only occupied by the first assignment 213b and has a lower utilization (e.g., 35%). Thus, in the color bar 263 for consultant 204a, the color for the day in week 5 is heavier than the color for the day in week 12. Accordingly, the utilization of consultant 204b, 205a, 205b, 206a, 206b can be represented by the color bar 264, 265a, 265b, 266a, 266b, respectively.

In some examples, the map 262 represents a passive assignment same as an active assignment, based on utilization of a resource (e.g., the color bar 205a for the vacation 215 of the consultant 205a). The map 262 can also represent a soft-booked assignment same as a hard-booked assignment. In some other examples, the map represents the passive assignment different from the active assignment and/or the soft-booked assignment different from the hard-booked assignment (e.g., by using a different type of color scale to represent the passive assignment and/or the soft-booked assignment).

The compressed view 250 hides detailed information associated with the resources and/or the assignments and presents the resource availability or utilization on a more abstract or higher level. For example, from the map 262, a user can quickly determine that consultants 204a, 204b, 205a, 205b are all available during weeks 13 and 14, and new assignments can be assigned to these consultants during this period. The compressed view 250 can still enable a user to get such detailed information (e.g., what is a special resource's utilization during a time period), such that the user can plan more accurately for new assignments without having negative impact on a resource's work load. In some examples, the compressed view 250 includes the button 208b enabling the user to toggle back to the detailed view 200.

In some implementations, the map 262 provides a feature allowing a user to view detailed information associated with an assignment. As illustrated in a view 270 in FIG. 2C, when the user selects a portion 263b of a particular utilization visual element 263 of the map 262 (e.g., by moving a cursor to the portion), the resource scheduling system can receive the user input from the UI and determine that the particular utilization visual element 263 corresponds to a particular resource (e.g., consultant 204a), and the selected portion 263b corresponds to a particular assignment 213b (e.g., project 1 over a time period from week 6 to week 12) assigned to the particular resource 204a. Accordingly, the resource scheduling system can hover a display 280 over the map 262. The display 280 is adjacent to the selected portion. The display 280 can include information associated with the particular assignment 213b. The information can include a duration of the assignment (e.g., a project name, a starting date and an ending date, assigned days, a role name and/or identifier, an assignment type, consumer name, and/or comments). When the user moves the cursor away from the color bar 263 (e.g., to a blank area), the display 280 disappears or is hidden from the map 262.

Referring back to FIG. 2B, the compressed view 250 can include a feature to adjust a representation of the map 262. In some implementations, the compressed view 250 includes a sharp/blur slider 259 to adjust a sharpness or blur of the map 262. A user can move or slide a controller 259a to change the sharpness of the map 262 (e.g., from a sharp state on the left to a blurred state on the right). The change can be smoothly or gradually. Changing the sharpness of the map 262 corresponds to changing the sharpness of the utilization visual elements (e.g., the color bars 263, 264, 265a, 265b). In some implementations, the blurring feature can be realized by other types (e.g., zooming buttons "+" or "−").

FIG. 2C shows the compressed view 250 in the sharp state, and FIG. 2D shows an example view 290 when the map 262 is at the blurred state. The map 262 becomes a blurred map 292 at the blurred state. The blurred map 292 can have a more abstract impression for when areas are busy or rather free to quickly identify the utilization or availability of the resources. The blurring can be performed by using a blurring algorithm (e.g., a Gaussian blurring function). The blurring can be performed in one direction (e.g., along the row timeline 211a), or in two directions (e.g., along the row timeline 211a and along a column timeline) at each time point of the timeline 211a (e.g., an hour based timeline).

As noted above, utilization of a resource can be presented along the row timeline 211a and also be presented along the column timeline, as illustrated in the detailed view of FIG. 2A. The utilization visual elements in the map 262 can be generated based on the two timelines and represent along the two timelines. When the compressed view 250 is blurred, the utilization visual elements (e.g., the color bars) are blurred along the two timelines. For example, for consultant 204a, the color bar 263 is blurred into the blurred bar 293 along the timeline 21a. The color bar 263 is also blurred along the column timeline (e.g., at a day in week 7) into blurred area 293a corresponding to utilization and blurred area 293b corresponding to no utilization.

Figure 3:
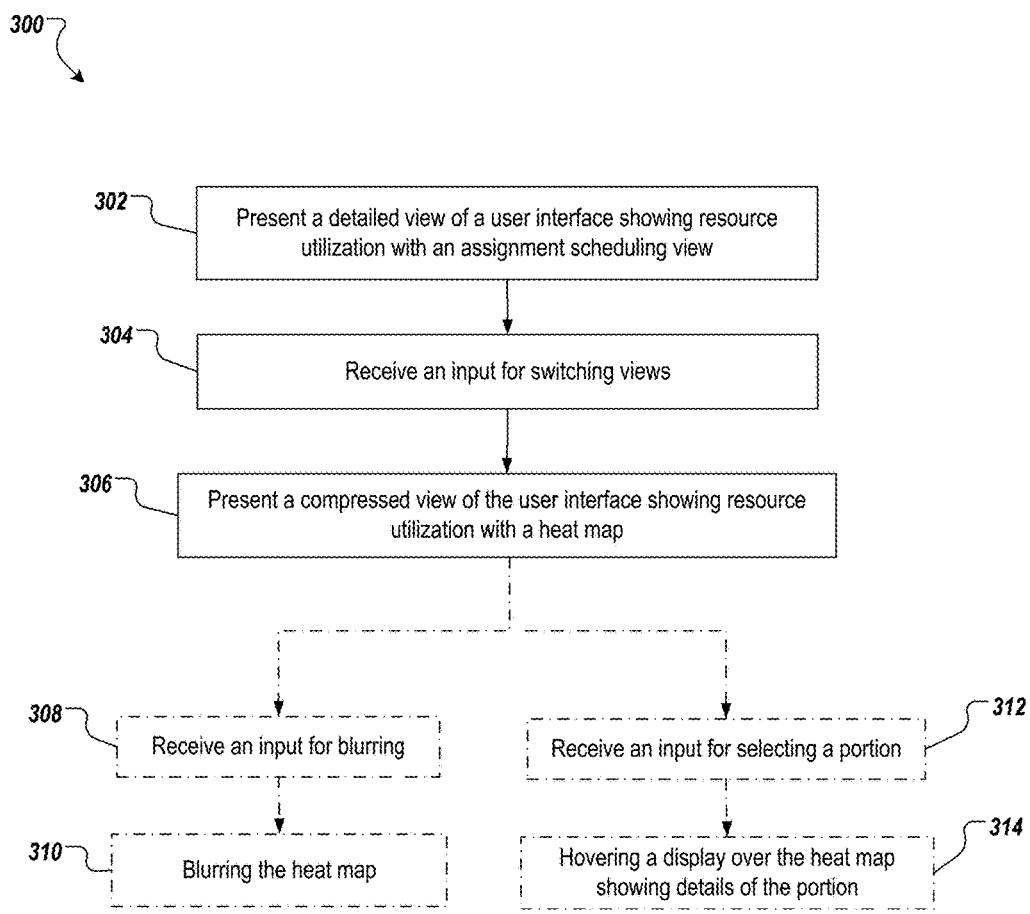
FIG. 3 depicts an example process that can be executed in accordance with implementations of the present disclosure.

FIG. 3 depicts an example process 300 that can be executed in accordance with implementations of the present disclosure. In some implementations, the example process 300 can be realized using one or more computer-executable programs executed using one or more computing devices. For example, the process 300 can be realized using the computing device 102 of FIG. 1 and/or a resource scheduling system in the back-end system 106 of FIG. 1.

A detailed view of a user interface is presented (302). The user interface can be a user interface of a resource scheduling system in the back-end system. The user interface can be presented on a display screen of the computing device. The detailed view can be the detailed view 200 of FIG. 2A.

The detailed view includes a first plurality of resources displayed in a first area and an assignment scheduling view displayed in a second area. The assignment scheduling view shows utilization of the first plurality of resources. The assignment scheduling view can be a Gantt-chart-like view (e.g., the assignment scheduling view 212 of FIG. 2A). The assignment scheduling view can be defined along a timeline. The assignment scheduling view can include assignment visual elements representing respective assignments assigned to respective resources over respective time periods along the timeline. The assignment visual elements include information associated with the assignments, e.g., assignment types and/or titles. The detailed view can also include information associated with the first plurality of resources (e.g., resource names, types, and availability at a particular time point).

In some implementations, a time period comprises a plurality of time points along the timeline. Each time point can have a plurality of smaller time points. For example, a time point is a day and a smaller time point is an hour. At the time point (e.g., a day), utilization of a resource can be defined along a new timeline with the smaller time point (e.g., an hour-based timeline). Each assignment visual element can represent respective utilization of a respective resource by the assignment at each of the plurality of time points along the new timeline. In some cases, the timeline is a row timeline, and the new timeline at each time point is a column timeline. The utilization of a resource can be defined along the row and column timelines in two dimensions.

A user input for switching views is received (304). The user input can indicate switching the user interface from the detailed view to a compressed view. For example, a use can click a switching button (e.g., the button 208b of FIG. 2A) to toggle between the detailed view and the compressed view.

The compressed view is presented (306). The compressed view shows resource utilization with a heat map. The compressed view can be the compressed view 250 of FIG. 2B. The compressed view includes a second plurality of resources displayed in the first area and the heat map displayed in the second area. The heat map can be defined along the timeline and include, for each resource of the second plurality of resources, a respective utilization visual element along the timeline. The utilization visual element represents respective utilization of the resource at each time point of the timeline in a visual gradient.

In some implementations, the visual gradient is a color scale or a gray scale. A white color in the visual gradient represents no utilization of a resource, and a heavier color represents larger utilization of a resource than a lighter color. The utilization visual element in the heat map can be a color bar. A utilization visual element for a resource does not include or excludes information associated with assignments assigned to the resource.

In some implementations, the compressed view does not include detailed information associated with each resource of the second plurality of resources. The second plurality of resources can include the first plurality of resources, and a number of the second plurality of resources is greater than a number of the first plurality of resources.

In some implementations, the compressed view can be generated based on the detailed view (e.g., based on utilization of each resource at each time point of the timeline). As noted above, the utilization of each resource can be defined along the row timeline and the column timeline. If, at a particular time point, the resource is occupied or utilized by two or more assignments, the utilization of the resource is based on a sum of each utilization by the one or more assignments. A utilization visual element for the resource at the particular time point can correspond to the summed utilization. In some implementations, the utilization visual element is represented in both the row timeline and the column timeline, and the utilization visual element is represented by individual utilizations by the one or more assignments.

In some implementations, the user interface can receive a second user input to switch the user interface from the compressed view to the detailed view. For example, a user can click a switching button (e.g., the button 208b of FIG. 2B). Consequently, the detailed view can be presented.

In some implementations, an input for blurring the heat map in the compressed view is received (308). For example, the compressed view can include a slider for adjusting the sharpness/blur of the heat map. A user can move the slider to change the sharpness of the heat map. In response to receiving the second input, the resource scheduling system can blur the utilization visual elements of the heat map in the second area (310) (e.g., using a Gaussian blurring function). The utilization visual elements can be blurred along the row timeline, or along both the row and column timelines.

In some implementations, an input for selecting a portion of the heat map is received (312). For example, a user can move a cursor to the portion of a utilization visual element. The resource scheduling system can receive the user input and determine that the utilization visual element corresponds to a particular resource and that the selected portion corresponds to a particular assignment assigned to the particular resource. The resource scheduling system can hover, in the compressed view, a display over the heat map and adjacent to the selected portion (314). The display includes detailed information associated with the particular assignment.

Figure 4:
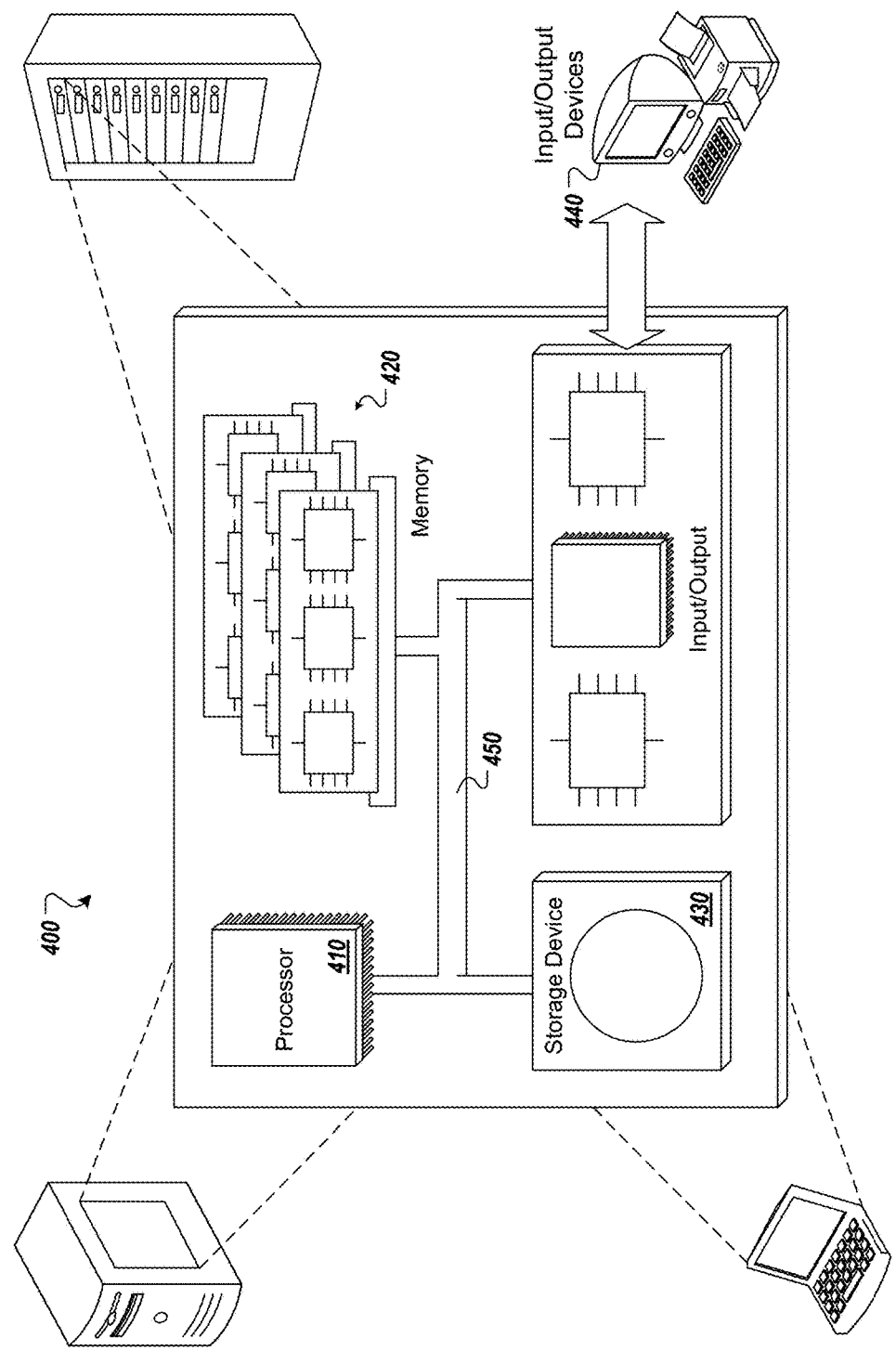
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for presenting resources utilization in a user interface (UI), the method being executed using one or more processors and comprising:

presenting, by the one or more processors, a first view of the UI on a display screen, the first view comprising a first plurality of resources displayed in a first area and an assignment scheduling view displayed in a second area, the assignment scheduling view being defined along a timeline and comprising a first assignment visual element representing a first assignment assigned to a first resource over a first time period along the timeline, the first assignment visual element comprising information associated with the first assignment;

receiving, by the one or more processors, an input for switching the UI from the first view to a second view; and presenting, by the one or more processors, the second view of the UI on the display screen, the second view comprising a second plurality of resources displayed in the first area and a map displayed in the second area, the map being defined along the timeline and comprising, for each resource of the second plurality of resources, a respective utilization visual element along the timeline, the respective utilization visual element representing respective utilization of a respective resource at each time point of the timeline in a visual gradient, the visual gradient comprising a visible characteristic that varies in degree in proportion with a percentage of the respective utilization of the respective resource relative to an availability of the respective resource, wherein the second plurality of resources comprises the first plurality of resources, and a second number of the second plurality of resources is greater than a first number of the first plurality of resources, and wherein the map comprises a first utilization visual element for the first resource that excludes the information associated with the first assignment.

2. The method of claim 1, wherein the first time period comprises a plurality of first time points along the timeline, wherein the first assignment visual element represents respective utilization of the first resource by the first assignment at each of the plurality of first time points, and wherein, at each of the plurality of the first time points, the first utilization visual element is determined in the visual gradient at least partially based on the respective utilization of the first resource by the first assignment.

3. The method of claim 2, wherein the assignment scheduling view comprises a second assignment visual element representing a second assignment assigned to the first resource over a second time period along the timeline, the second time period comprising a particular time point of the first time points in the first time period, and wherein, at the particular time point, the first utilization visual element is determined in the visual gradient based on a sum of a first utilization of the first resource by the first assignment and a second utilization of the first resource by the second assignment.

4. The method of claim 1, wherein the map is a heat map, and the visual gradient is a color scale or a gray scale, and wherein a white color in the visual gradient represents no utilization of a first particular resource, and a heavier color represents larger utilization of a second particular resource than a lighter color.

5. The method of claim 1, further comprising:
receiving a second input for switching the UI from the second view to the first view; and
presenting the first view of the UI on the display screen.

6. The method of claim 1, further comprising:
receiving a second input for zooming in the map in the second view; and
blurring, using a blurring filter, the utilization visual element of the map in the second area.

7. The method of claim 1, further comprising:
determining that a portion of a particular utilization visual element of the map in the second view is selected, the particular utilization visual element corresponding to a particular resource, the portion corresponding to a particular assignment assigned to the particular resource, and
hovering, in the second view, a display over the map and adjacent to the portion, the display comprising information associated with the particular assignment.

8. A non-transitory computer-readable storage medium coupled to one or more processors and having instructions stored thereon which, when executed by the one or more processors, cause the one or more processors to perform operations for presenting resources utilization in a user interface (UI), the operations comprising:
presenting, by the one or more processors, a first view of the UI on a display screen, the first view comprising a first plurality of resources displayed in a first area and an assignment scheduling view displayed in a second area, the assignment scheduling view being defined along a timeline and comprising a first assignment visual element representing a first assignment assigned to a first resource over a first time period along the timeline, the first assignment visual element including information associated with the first assignment;
receiving, by the one or more processors, an input for switching the UI from the first view to a second view; and
presenting, by the one or more processors, the second view of the UI on the display screen, the second view comprising a second plurality of resources displayed in the first area and a map displayed in the second area, the map being defined along the timeline and comprising, for each resource of the second plurality of resources, a respective utilization visual element along the timeline, the respective utilization visual element representing respective utilization of a respective resource at each time point of the timeline in a visual gradient, the visual gradient comprising a visible characteristic that varies in degree in proportion with a percentage of the respective utilization of the respective resource relative to an availability of the respective resource,
wherein the second plurality of resources comprises the first plurality of resources, and a number of the second plurality of resources is greater than a number of the first plurality of resources, and
wherein the map comprises a first utilization visual element for the first resource that excludes the information associated with the first assignment.

9. The computer-readable storage medium of claim 8, wherein the first time period comprises a plurality of first time points along the timeline,
wherein the first assignment visual element represents respective utilization of the first resource by the first assignment at each of the plurality of first time points, and
wherein, at each of the plurality of the first time points, the first utilization visual element is determined in the visual gradient at least partially based on the respective utilization of the first resource by the first assignment.

10. The computer-readable storage medium of claim 9, wherein the assignment scheduling view comprises a second assignment visual element representing a second assignment assigned to the first resource over a second time period along the timeline, the second time period comprising a particular time point of the first time points in the first time period, and
wherein, at the particular time point, the first utilization visual element is determined in the visual gradient based on a sum of a first utilization of the first resource by the first assignment and a second utilization of the first resource by the second assignment.

11. The computer-readable storage medium of claim 8, wherein the map is a heat
map, and the visual gradient is a color scale or a gray scale, and
wherein a white color in the visual gradient represents no utilization of a first particular resource,
and a heavier color represents larger utilization of a second particular resource than a lighter color.

12. The computer-readable storage medium of claim 8, wherein the operations further comprise:
receiving a second input for switching the UI from the second view to the first view; and
presenting the first view of the UI on the display screen.

13. The computer-readable storage medium of claim 8, wherein the operations further comprise:
receiving a second input for zooming in the map in the second view; and
blurring, using a blurring filter, the utilization visual element of the map in the second area.

14. The computer-readable storage medium of claim 8, wherein the operations further comprise:
determining that a portion of a particular utilization visual element of the map in the second view is selected, the particular utilization visual element corresponding to a particular resource, the portion corresponding to a particular assignment assigned to the particular resource, and
hovering, in the second view, a display over the map and adjacent to the portion, the display comprising information associated with the particular assignment.

15. A system, comprising:
a client-side computing device comprising one or more processors and
a computer-readable storage device coupled to the client-side computing device and having instructions stored thereon which, when executed by the one or more processors of the client-side computing device, cause the one or more processors to perform operations for presenting resources utilization in a user interface (UI), the operations comprising:
presenting a first view of the UI on a display screen, the first view comprising a first plurality of resources displayed in a first area and an assignment scheduling view displayed in a second area, the assignment scheduling view being defined along a timeline and comprising a first assignment visual element representing a first assignment assigned to a first resource over a first time period along the timeline, the first assignment visual element including information associated with the first assignment;
receiving an input for switching the UI from the first view to a second view; and presenting the second view of the UI on the display screen, the second view comprising a second plurality of resources displayed in the first area and a map displayed in the second area, the map being defined along the timeline and comprising, for each resource of the second plurality of resources, a respective utilization visual element along the timeline, the respective utilization visual element representing respective utilization of the a respective resource at each time point of the timeline in a visual gradient, the visual gradient comprising a visible characteristic that varies in degree in proportion with a percentage of the respective utilization of the respective resource relative to an availability of the respective resource, wherein the second plurality of resources comprises the first plurality of resources, and a number of the second plurality of resources is greater than a number of the first plurality of resources, and wherein the map comprises a first utilization visual element for the first resource that excludes the information associated with the first assignment.

16. The system of claim 15, wherein the first time period comprises a plurality of first time points along the timeline, wherein the first assignment visual element represents respective utilization of the first resource by the first assignment at each of the plurality of first time points, wherein the assignment scheduling view comprises a second assignment visual element representing a second assignment assigned to the first resource over a second time period along the timeline, the second time period comprising a particular time point of the first time points in the first time period, and wherein, at the particular time point, the first utilization visual element is determined in the visual gradient based on a sum of a first utilization of the first resource by the first assignment and a second utilization of the first resource by the second assignment.

17. The system of claim 15, wherein the map is a heat map, and the visual gradient is a color scale or a gray scale, and wherein a white color in the visual gradient represents no utilization of a first particular resource, and a heavier color represents larger utilization of a second particular resource than a lighter color.

18. The system of claim 15, wherein the operations further comprise:

receiving a second input for switching the UI from the second view to the first view; and presenting the first view of the UI on the display screen.

19. The system of claim 15, wherein the operations further comprise:

receiving a second input for zooming in the map in the second view; and blurring, using a blurring filter, the utilization visual element of the map in the second area.

20. The system of claim 15, wherein the operations further comprise:

determining that a portion of a particular utilization visual element of the map in the second view is selected, the particular utilization visual element corresponding to a particular resource, the portion corresponding to a particular assignment assigned to the particular resource, and hovering, in the second view, a display over the map and adjacent to the portion, the display comprising information associated with the particular assignment.

* * * * *